United States Patent Office 3,235,234
Patented Feb. 15, 1966

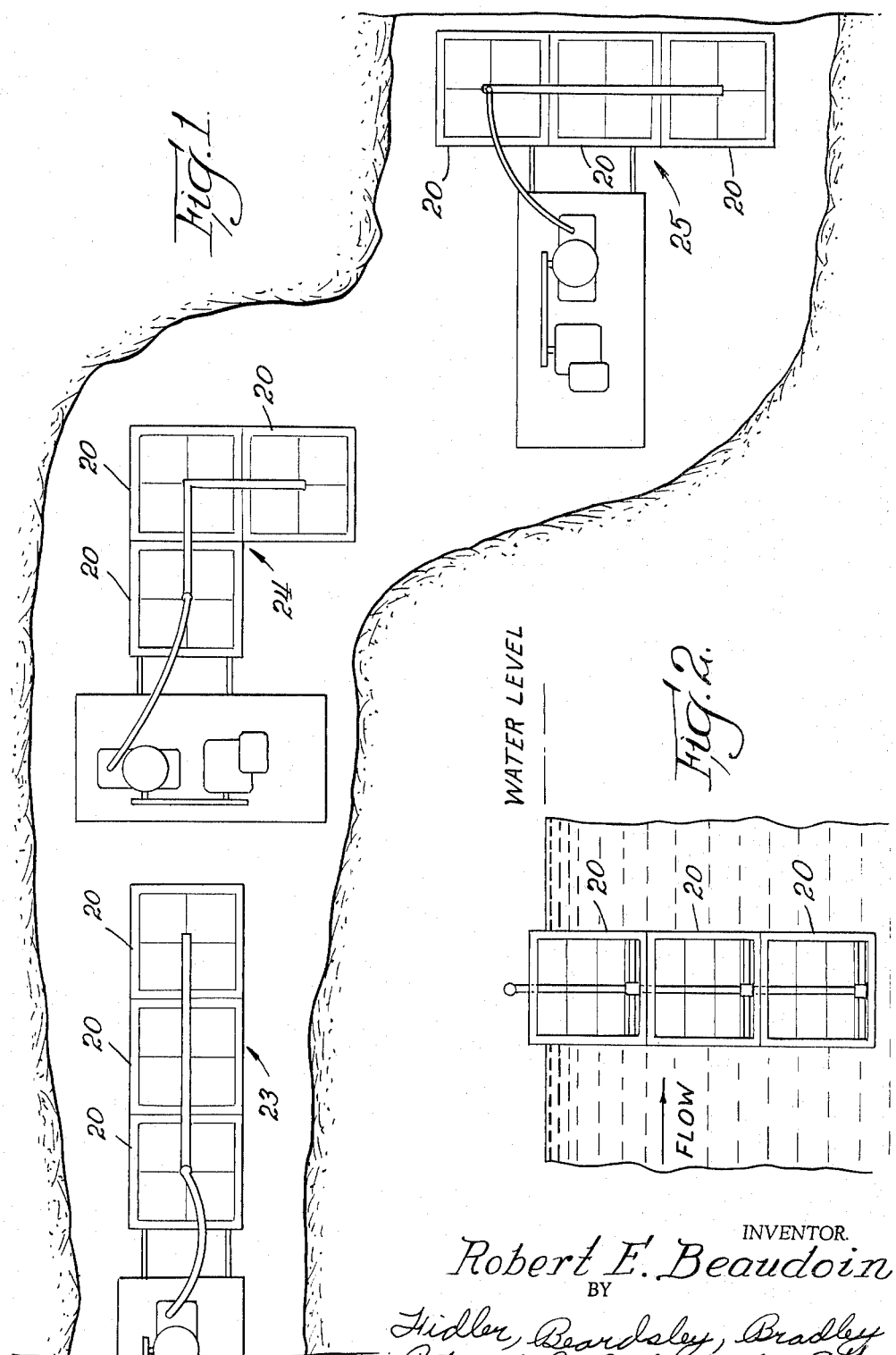

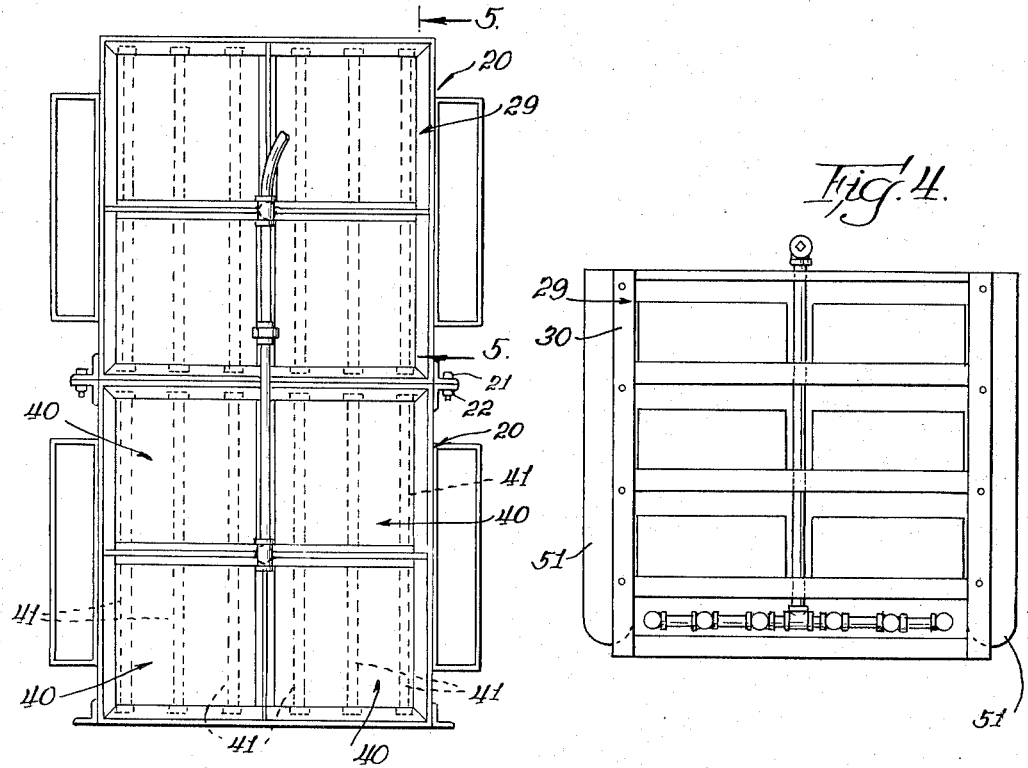
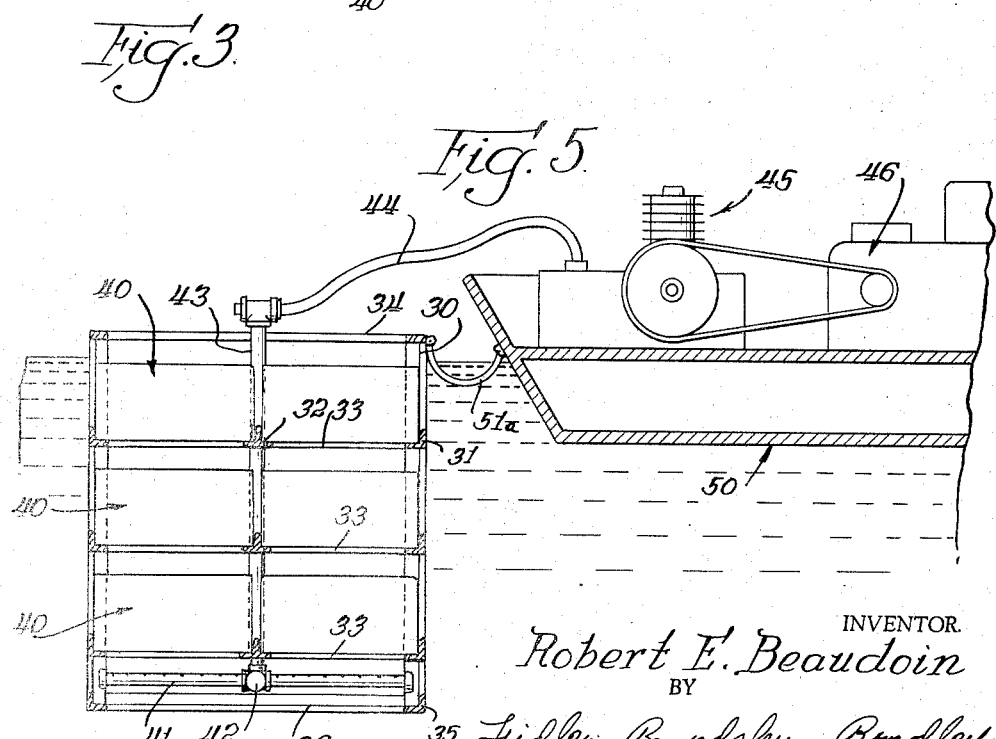

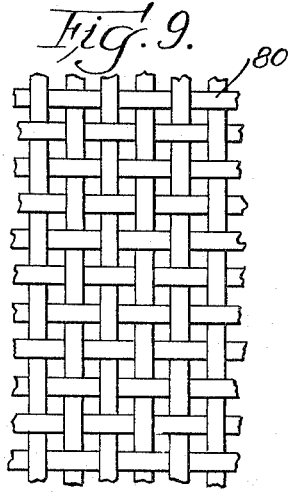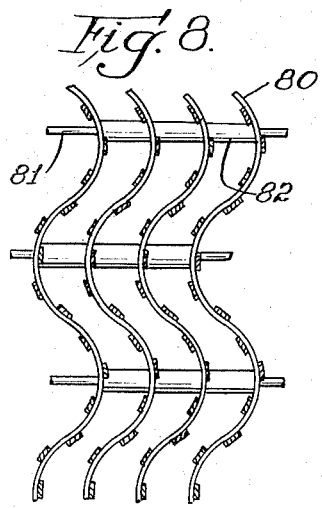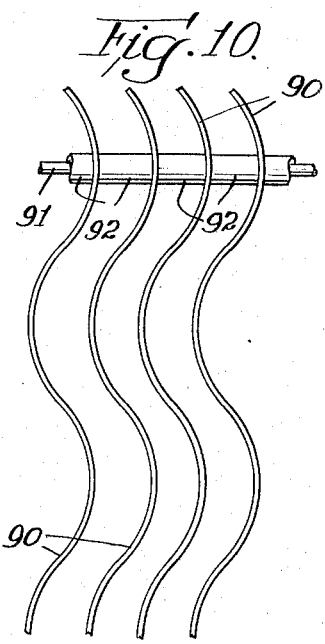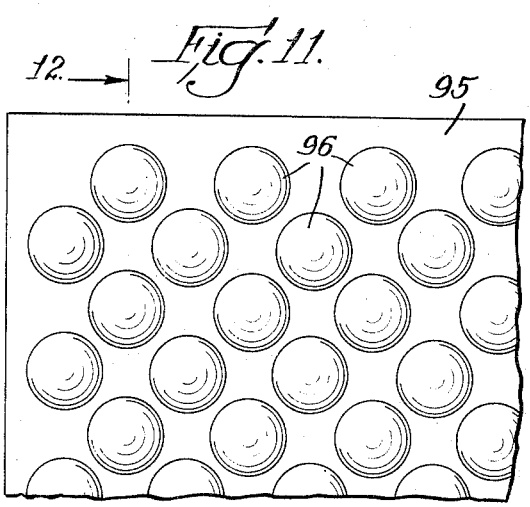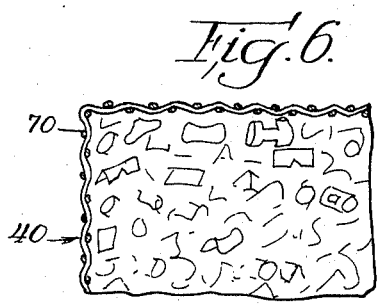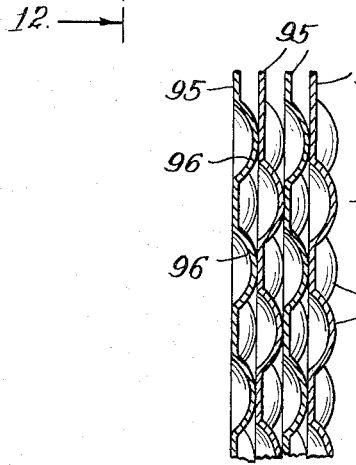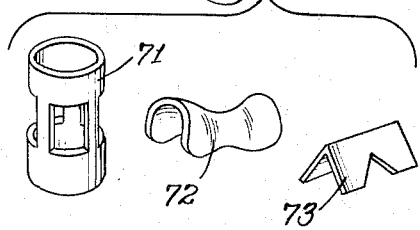

3,235,234
APPARATUS FOR AERATING WATER
Robert E. Beaudoin, Brookfield, Ill., assignor to Pacific Flush Tank Company, Chicago, Ill., a corporation of Illinois
Filed Feb. 11, 1963, Ser. No. 257,690
10 Claims. (Cl. 261—24)

This invention relates to a method and apparatus for purifying biologically contaminated water, and has to do more particularly with a new and improved method and apparatus for oxidizing the organic matter in a body of water such as a lake, stream, pond or lagoon.

It is well known that the biological contamination of a body of water such as a lake, stream, pond or lagoon can be reduced by oxidizing the organic material therein. Heretofore, this has been done in several ways. One such expedient has been to diffuse air into the water. Due to the short period of contact between the air and the water, only a small percentage of the air is dissolved and a very large quantity of air is required for effective oxidation. Therefore, aeration by diffusion is not practicable where a large body of water is involved.

Attempts to aerate bodies of water by mechanical agitation at the surface have also been made. Here too, the period of contact between the air and the water is relatively short so that a relatively small amount of air is brought into contact with and dissolved in the water. Moreover, the only water which is brought into contact with the air is that which is brought to the surface and into contact with the air. Thus, a relatively large quantity of water must be moved to effect relatively complete aeration of a large body of water.

In accordance with the present invention, an aeration device is provided which is submerged in the body of water to be purified and which includes a porous mass of material having a large surface area on which forms a biological growth or slime. The liquid in the body of water to be aerated is caused to flow through the device by reason of the natural current of the body of water or by the upward currents caused by the introduction of air under the porous mass, or a combination of both. Such air introduced under the porous mass is allowed to flow upwardly therethrough and past the surface of biological growth.

The oxidizing of organic matters is caused by the oxygen which is a component of air. It will be understood that oxygen may be employed in the present invention either in pure form or as it occurs in air. Preferably, due to the cost of pure or relatively pure oxygen, air will be used. The air is, of course, air which is free of any substance which is harmful to the growth of the bacterial growth on the porous mass or to the water. Normally, air is drawn from the atmosphere adjacent to the device and is compressed and supplied to the diffusers. Thus, when the term "oxygen" is used herein, it will be understood that it includes air as well as pure, or relatively pure, oxygen.

When the device is first placed in use, it will have no biological growth on the faces of the members forming the porous mass. However, after a period of operation, a biological growth or "slime" similar to the biological slime on a trickling filter will form and build up on the surfaces of the mass and will remain in the form of an adherent layer or film. It will be understood that, just as in a trickling filter, portions of the growth will slough off and drop from and be carried away from the device, but there will remain a sufficient growth to maintain a good growth of aerobic organisms. The biological material or slime assimilates the oxygen which is supplied to the aeration device to stimulate the growth of the biological material. This biological material then tends to oxidize the organic matter, which passes along and is adsorbed by the biological slime in both liquid and colloidal or suspended solid form, thus utilizing the effectiveness of the oxygen for an extended period of time. Some of the oxygen which is introduced into the body of water is dissolved therein, thus further oxidizing the organic matter in the water.

The porous mass has passages extending therethrough both from top to bottom and from end to end. Thus the oxygen can pass upwardly through the mass while at the same time the water to be aerated can pass through the mass from end to end. The porous mass also may have passages through it from side to side so that the water can pass through it from side to side.

The Biological Oxygen Demand (B.O.D.) in a body of water such as a stream, lake, pond or lagoon will be different in different portions thereof and will vary from time to time in such different portions as the contamination varies. Biological Oxygen Demand may be defined as the quantity of oxygen utilized in the biochemical oxidation of organic matter in a specific time and at a specific temperature, being determined by the availability of the organic matter as a biological food and by the amount of oxygen utilized by the micro-organisms during oxidation. In accordance with the present invention, the aeration device is provided with buoyancy chambers which cause it to float, but which can be flooded to cause it to submerge for use. The device is adapted to be moved to the location where the B.OD. is the greatest so as to provide the maximum benefit from the use of the device. The device is then submerged. Where the depth of water is sufficient to permit such action, the aeration device can be moved from place to place while still in submerged condition. However, where the device is to be moved to or through a shallow area, it may be necessary to raise it at least partially out of the water. This can readily be done by at least partially emptying the buoyancy chambers. This is affected by pumping the water from the buoyancy chambers or by causing compressed air to flow into the buoyancy chambers and force therefrom all or a portion of the water which was allowed to enter such chambers initially to cause the device to sink in the water. Even though the depth of water is sufficient to permit movement through the water of the device in submerged condition, it may be found desirable in order to permit easier movement to increase the buoyancy and thus raise a substantial portion of the device above the level of the body of water.

In accordance with the invention, the flow of the water in the body of water to be treated is employed to carry the water past and through the aeration device. In the case of a stream, there is a natural flow. Similarly, in most lakes and ponds there are currents which result from springs or the natural flow of water into and out of the lake or pond. In the case of lagoons, water is caused to flow in and out either by gravity or by pumping. Thus it ordinarily is not necessary to affect any pumping of the water solely for the purpose of causing it to flow through the aeration device. The device is also effective even where there is no flow of water past the aeration device other than that created by the device itself. It will be understood that the introduction of air into the body of water in which the device is located will create an upward current through the device and water will thus be circulated through the device. Thus, there will be at least a local flow of water through the device.

In conventional processes for aerating a body of water, the air introduced into the water through a diffuser or by agitating the water and bringing it into contact with the air which is above the body of water to be aerated serves merely to act chemically on the biological contaminants in the water. In either case, the contact time is so short that full effectiveness of the oxygen is not made. In accordance with the present invention, the oxygen in the air is brought into contact with the biological slime on the contact material and is absorbed by the slime. This stimulates the growth of the bacteriological slime which in turn breaks down the contaminants. Thus, fuller utilization is made of the oxygen in the air by the present process than in the prior processes. The contaminants of an organic nature act as a food source for the micro-organisms in the biological slime which, in the presence of oxygen or air, convert this organic matter to a form which no longer causes objectionable conditions or contamination.

An object of the present invention is to provide a new and improved method of purifying a body of biologically contaminated water.

Another object is to provide a new and improved method of reducing the biological oxygen demand of a body of water.

A further object is to provide a method of reducing the biological oxygen demand of a body of water wherein a substantial portion of such reduction is affected by a biological growth.

A further object is to provide a method of aerating a relatively large quantity of water with the expenditure of a relatively small amount of power.

A further object is to provide a method of aerating a body of water in which method the flow in the body of water is utilized to increase the effectiveness of the aeration.

Another object is to provide new and improved apparatus for purifying a body of biologically contaminated water.

Another object is to provide an aeration device which can be utilized to aerate a relatively large quantity of water with a relatively small expenditure of power.

Another object is to provide an aeration device which can be moved from place to place in a body of water such as a lake, stream, pond or lagoon.

Another object is to provide an aeration device which can be floated to a desired location in a body of water, then submerged for effecting aeration and then surfaced for movement to a new location.

Another object is to provide an aeration device comprising a porous mass having a surface or surfaces on which a biological slime will form and means for passing oxygen through the mass to promote the growth of the biological slime.

Other objects and advantages of the invention will appear from the following description taken in connection with the accompanying drawings wherein:

FIGURE 1 is a somewhat diagrammatic top plan view of a stream wherein is located three different arrangements of muliple aeration devices according to the invention;

FIG. 2 is a somewhat diagrammatic end elevational view of one of the aeration devices of FIG. 1;

FIG. 3 is a top plan view of a two-unit aeration device;

FIG. 4 is an end elevational view of the device of FIG. 3;

FIG. 5 is a view of a section taken along line 5—5 of FIG. 3, showing additionally a float carrying means for producing a flow of air;

FIG. 6 is an enlarged, fragmentary detail of one form of porous mass used in the aeration device;

FIG. 7 is a view of three members used in forming the porous mass of FIG. 6;

FIG. 8 is a fragmentary side elevational view of a second form of porous mass;

FIG. 9 is a face view of one of the woven members used in forming the porous mass of FIG. 8, before such member is corrugated;

FIG. 10 is a fragmentary side elevational view of a third embodiment of porous mass;

FIG. 11 is a fragmentary face view of a fourth embodiment of porous mass; and

FIG. 12 is a view of a section taken along line 12—12 of FIG. 11.

The aeration device or aerator of the invention includes one or more sections or units 20, two of which are shown in FIG. 3. The sections 20 may be secured together as by bolts 21 and nuts 22, either in a single line such as the device 23 of FIG. 1 and adapted to extend longitudinally of a stream, or in an L-shaped formation such as the device 24 of FIG. 1, which accommodiates itself to a bend in the stream, or in a row extending transversely of the stream such as the device 25 of FIG. 1.

Depending upon the depth of the body of water, a plurality of sections 20 may be assembled in vertically stacked relation such as shown in FIG. 2 and suitably secured together. Such a stack as shown in FIG. 2 may take the form of a single stack or a plurality of stacks arranged side by side in a manner similar to any of the devices shown in FIG. 1.

Each section 20 includes a frame 29 including a plurality of vertical members 30, a plurality of end members 31, a plurality of central members 32, a plurality of side members 33, a plurality of top members 34, bottom end members 35 and bottom side members 36. The foregoing members forming the frame are suitably secured together, as by bolting (not shown), so that the frame is rigid. The members forming the frame are formed of any suitable rigid material and preferably one which is resistant to rust and corrosion, such as aluminum.

A plurality of porous mass units 40 are provided which are formed in a manner hereinafter described, and are seated in the frame on the end members 31 and side members 33. Extending under the bottom-most porous mass unit 40 is a diffusion means which preferably includes a plurality of perforated pipes or diffusers 41 connected to a horizontal header 42 and connected to the header 42 is a vertical supply pipe 43. The pipe 43 extends upwardly through the top of the device and is connected by a hose 44 to an air compressor 45 driven by a suitable source of power such as a gasoline engine 46. In this connection, where the device is to be used in proximity to a source of electric power, an electric motor (not shown) may be substituted for the gasoline engine.

The air compressor 45 and engine 46 are buoyantly supported on a float or raft 50 suitably attached to the frame as by a cable or cables 51a. Alternatively, the air compressor 45 and driving means 46 may be mounted on a frame-work or platform (not shown) on the floating aeration unit located a sufficient elevation above the top surface of the top porous mass unit so as not to be affected by the rising column of air and liquid.

The diffuser may consist merely of a pipe having a plurality of openings therein through which a plurality of jets of oxygen may be discharged into the body of water in which the pipe is disposed. Alternatively, and preferably, the pipe may carry a diffuser head of conventional form having means for discharging a large number of finely divided streams of oxygen into the body of water. Accordingly, it will be understood that the term "diffuser" as used herein includes any and all suitable forms of oxygen diffusing means above-mentioned.

The aeration unit 20 includes one or more, and preferably a plurality of buoyancy chambers 51, which are attached to the sides of the frame and which are arranged when empty, or partially empty, to buoyantly support the aeration unit in a body of water with a substantial portion of the unit extending above the level of the water. The buoyancy chambers 51 are arranged to maintain the unit 20 upright and in balanced condition. The buoyancy chambers 51 are adapted to receive water therein, whereby the unit may be partially or substantially immersed as seen in FIGS. 2 and 5. The frame and the buoyancy chambers may be considered a raft.

The buoyancy chambers 51 may be filled or emptied by suitable means (not shown) whereby water may be introduced into the chambers when desired and removed from the chambers to change the buoyancy.

The buoyancy chambers 51 are shown as being open at their upper portions. Thus, water may be introduced into these chambers by pumping it from the body of water through a hose (not shown) to which is connected a suitable pumping means such as a reversible pump. In order to increase the buoyancy of the aerator, the water is removed from the buoyancy chambers as by pumping. If desired, the buoyancy chambers 51 may be closed and water pumped therein in a suitable manner, means being provided for permitting the air to be discharged as the water enters. The water is removed from the closed chambers by pumping it out or by pumping air into the chambers under pressure to force the water out.

The porous mass above referred to may be formed in any one of a number of different ways, now to be described. It will be understood that the term "porous mass" designates the member or members of the aeration device on which the biological slime forms. The arrangement is such as to provide a large surface area and passages through the mass in a horizontal direction to permit the water to pass through the mass horizontally and passages in a vertical direction to permit air to pass upwardly through the mass. The arrangement is such that any opposed surfaces are spaced apart a sufficient distance to permit the biological slime to form on the surfaces and to slough off and fall free of the mass. The passages must be of sufficient size so that they are not completely clogged by the biological growth to such an extent that when the growth reaches its maximum thickness it will prevent the passage of oxygen and water. It will be understood that the growth or portions thereof will slough off the surfaces from time to time. Therefore, the passages should be sufficiently large to permit the material which sloughs off to fall out of the porous mass or be carried out of the mass by the action of the oxygen and water flowing through the mass. To this end, I have found it desirable that the opposed surfaces be at least about 1" apart.

The material from which the mass is formed is preferably one which will not deteriorate over a long period of use. It is resistant to rot, fungus and the deteriorating action of bacterial growth as well as to rust, corrosion and attack from chemicals ordinarily found in lakes, streams, ponds and lagoons. Among the materials which I have found suitable are certain synthetic plastics.

A preferred form of porous mass unit 40 is shown fragmentarily in FIG. 6 and is contained in a container, preferably in the form of a reticulate basket 70 formed of heavy woven wire. The porous mass is formed by a plurality of shapes of one or more of the forms shown in FIG. 7. For example, the shapes may include Raschig rings 71, or Berl saddles 72, or random bent shapes 73, or a combination of one or more of such shapes.

Preferably, the unit of FIG. 6 is disposed removably in the frame 29 and provides the porous mass 40. Such porous mass unit can be readily removed should it become clogged, and either washed in water or in acid or other material which will remove the adherent biological slime and other solid matter which may have collected on the shapes.

The porous mass can alternatively be provided by a plurality of sheets 80 of woven material which are retained in corrugated form on rods 81 and spaced by spacing collars 82. The sheets may be woven from any suitable material and preferably a synthetic plastic is used because of its desirable ease in formation and properties in resisting deterioration during use. The porous mass unit shown in FIGS. 8 and 9 is inserted in the frame 29. This unit has the advantage that water can flow freely both through the spaces between adjacent sheets and through the sheets themselves. At the same time, the air can pass upwardly between the sheets and through the sheets. On the other hand, by reason of the form of the corrugated sheets, when installed, the air in passing upwardly through the porous mass will strike against the surface of the slime layer which forms on and adheres to the surfaces of the sheets.

A somewhat simpler form of porous mass unit is illustrated in FIG. 10. In this form, the unit is made up of a plurality of corrugated sheets 90 preferably formed of plastic, which are secured together by rods 91 and spaced apart by collars 92. It will be seen that the sheets 90 being spaced apart will permit the passage of water horizontally between the sheets. At the same time, air can pass upwardly through the spaces between the sheets. However, owing to the corrugated form of the sheets, the air will be compelled to strike against one or the other of two adjacent sheets a number of times during its passage upwardly through the porous mass. In this connection, it will be understood that in both FIGURES 8 and 10 only a fragment of the sheets is shown and there is a substantially larger number of corrugations than shown in the drawings.

A further embodiment of the porous mass is illustrated in FIGS. 11 and 12. In this form of the device, the porous mass includes a plurality of sheets 95 having projections or bumps 96 formed thereon and adapted to abut against an adjacent sheet. The arrangement of projections is such that each projection is positioned to abut against a planar portion of the adjacent sheet, thus both spacing the sheets apart a distance equal to the height of the projection and providing a plurality of serpentine paths between the sheets, both in a horizontal direction and in a vertical direction. When the porous mass of FIGS. 11 and 12 is in place, the water can pass between the plates 95 in a horizontal direction. At the same time, air can pass upwardly between each pair of adjacent sheets, but is compelled to follow a plurality of serpentine paths whereby it is caused to strike against the surface of the slime which is formed on the surface of the sheet. By reason of the provision of the bumps or projections on the sheets, it is not necessary to provide any spacer for the sheets as the latter are self-spacing. It will be understood that the sheets preferably are formed of plastic material and are of sufficient thickness to provide the desired rigidity. However, owing to the arrangement of the sheets and the fact that they are contained in a frame, it is not necessary to provide a high degree of rigidity of the individual sheets.

It will be understood that ordinarily where plate-like members such as shown in FIGS. 8 to 12 are used in forming the porous mass, a number of such members will be used. However, a single pair of members may be used and it will be understood that such is included in the term "porous mass."

It will be understood that the showings of various forms of porous masses are for the purpose of illustrating practical forms and that the invention is not limited to the particular forms shown but that other suitable forms may be used. It will be understood, however, that it is essential that the porous mass have an adequate surface area to receive the biological growth, proper surface texture to permit the adherence of the biological growth, suitable passageways and void spaces to permit the passage of oxygen through the mass and to prevent clogging of the passageways, suitable specific gravity to permit the aerator to be floated, absence of toxicity to the biological growth and adequate durability.

In practicing the present invention, the aerator is floated to the position in the body of water (lake, stream, pond or lagoon) where it is desired to reduce the contamination. Normally, this will be the portion of the body of water in which the contamination is the greatest, that is to say, the biological oxygen demand is the greatest. As mentioned above, the aerator may be floated to the desired location with the aerator substantially projecting above the surface of the water and then submerged to the desired extent by introducing water into the buoyancy tanks to cause the aerator to submerge so that only the upper portion is above the surface of the water and all or substantially all of the porous mass is submerged.

Where the aeration device is located in a body of water in which there is a natural current, such as a stream or some lakes, the water flows through the porous mass. Where the device is located in a body of water which has no natural current, such as a pond or lagoon, the water is caused to flow into and out of the pond or lagoon by gravity and is pumped into or out of the pond or lagoon. As will be understood, the supply of air to the device will also cause local currents through the porous mass.

The aerator may be used in a body of water in which there is no flow either natural or induced. In that case, the aerator may be moved about in the body of water to cause relative movement between the aerator and the water thus causing a flow of water through the porous mass, with the oxygen being supplied as above described.

Where a porous mass having passages therethrough both from side to side and from end to end, such as the porous mass shown in FIGS. 6 and 8, it is not necessary to orient the device in any particular manner relatively to the flow of water. However, where a porous mass such as shown in FIGS. 10 and 12 is employed, it is preferable to orient the porous mass so that the sheets extend generally parallel to the direction of flow of the water and the water flows readily through the spaces between the sheets.

Oxygen is supplied to the diffusion means. In the preferred embodiment, this is accomplished by operating the motor 40 to drive the compressor 45 and pump air under pressure to the diffusers 41 from which the air is discharged into the body of water under the porous mass 40. The air passes upwardly through the porous mass along the passages defined thereby. In all forms of the invention, the passages do not extend straight upwardly but are tortuous or serpentine. Thus, the air will not pass upwardly in a truly vertical direction, but will repeatedly strike against the surfaces of the members forming the porous mass.

After the device has been in use for a period which varies with the nature of the water in which it is located, organic matter will adhere to the surfaces of the members forming the porous mass and a biological slime will build up in the surfaces, which slime is similar to that which forms on a trickling filter. During operation, the water which flows through the porous mass will pass in contact with such slime and organic matter in the water both in liquid and in colloidal or suspended form and will be taken up by the slime generally by adsorption.

The oxygen which is diffused into the water under the porous mass passes in contact with the slime and is assimilated thereby. This stimulates the growth of the biological materal forming the slime and such material tends to oxidize the organic matter which has been taken up by the slime.

Portions of the slime will slough off from time to time and will drop from the porous mass, the passages through the latter being of sufficient size to permit the action to take place.

Where it is desired to move the device to another location in the body of water, this usually can be done by floating it to such new location without resurfacing the device. However, where the device is to be moved through shallow water or it is otherwise desirable to do so, the device can be resurfaced by removing the water from the buoyancy tanks in the manner above described in connection with each of the several embodiments.

I claim:

1. Apparatus for stimulating the growth of biological organisms in a body of water comprising an open frame, a porous mass having a surface on which biological growths will form mounted on said frame, means including a float for buoyantly supporting said frame in said body of water, said porous mass being submergible in the body of water, and means for diffusing air under pressure into the body of water below said porous mass to cause said air to pass upwardly through said porous mass.

2. Apparatus for stimulating the growth of biological organisms in a body of water comprising a frame, a plurality of superimposed vertically spaced apart sections of a porous mass carried by said frame, said mass having a surface on which biological growths will form, means for buoyantly supporting said sections in said body of water, said sections being submergible in said stream, and means carried by said frame for diffusing air under pressure into said body of water and under said sections to cause said air to pass upwardly through said porous mass.

3. Apparatus for stimulating the growth of biological organisms in a body of water comprising an open frame adapted to be mounted in said body to permit the flow of water through said frame, means defining a buoyancy chamber carried by said frame for buoyantly supporting said frame, means for controlling the buoyancy of said chamber, a porous mass having a surface to which biological growths will adhere, said porous mass being carried by said frame and submergible in said body, and means carried by said frame for diffusing air under pressure into said body under said porous mass, to cause said air to pass upwardly through said mass.

4. Aeration apparatus comprising a raft, a porous mass carried by said raft and having a surface to which biological growths will adhere, means for buoyantly supporting said raft on a body of water, means for submerging said raft and said porous mass in said body of water and means carried by said raft for diffusing air under pressure into said body of water under said porous mass, to cause said air to pass upwardly through said mass.

5. Aeration apparatus comprising a first raft, a porous mass carried by said first raft and having a surface to which biological growths will adhere, means for buoyantly supporting said first raft in a body of water, said first raft and said porous mass being submergible in said body of water, an oxygen diffuser carried by said first raft for diffusing oxygen into said body of water under said porous mass to stimulate and maintain said growths formed on said surface, a second raft, means for buoyantly supporting said second raft in a body of water, an air compressor carried by said second raft and an air conduit connected between said compressor and said diffuser.

6. Aeration apparatus comprising a porous mass including a plurality of spaced, corrugated reticulate members having at least certain of their surfaces in opposed relation, an open framework supporting said members, means for buoyantly suporting said framework and said mass in a body of water and means for diffusing air under pressure under said mass to cause said air to pass upwardly through said mass.

7. Aeration apparatus for purifying a body of water having a natural horizontal flow of water therein comprising a porous mass including a plurality of sheet-like members having projections thereon in abutting relation with adjacent members, thereby providing a plurality of generally serpentine paths between adjacent members, means for buoyantly supporting said mass in a body of water to permit the natural horizontal flow of said water through the paths between said members, and means for diffusing air under pressure under said mass to cause said air to pass upwardly through said mass.

8. Apparatus as set forth in claim 2 wherein said sections are mutually separable.

9. Apparatus for stimulating the growth of biological aerobic organisms in a large body of water comprising;

a framework adapted to be mounted in said body of water, said framework being open to permit the natural flow of water in a horizontal direction through the framework, buoyancy chamber means carried by said frame for buoyantly supporting said frame, means for controlling the buoyancy of said chamber means whereby adjustably to control the depth of said framework in said body of water, a plurality of biological aerobic growth supporting surfaces mounted in spaced apart relationship on said frame, thereby to be submergeable in said body of water, and means carried by said framework beneath said growth suporting surfaces for diffusing air under pressure into said body of water directly beneath said growth supporting surfaces whereby said air passes upwardly across said growth supporting surfaces to stimulate and maintain aerobic biological growths on said surfaces.

10. Apparatus as set forth in claim 9 wherein said growth supporting surfaces are provided on a plurality of porous masses, and means for removeably interconnecting said porous masses in vertically disposed positions with said masses being vertically spaced apart by a sufficient distance to permit the free horizontal flow of the water in said body of water to pass therebetween.

References Cited by the Examiner
UNITED STATES PATENTS

| | | | |
|---|---|---|---|
| 302,326 | 7/1884 | d'Heureuse | 261—120 |
| 1,477,894 | 12/1923 | Perry | 210—151 |
| 1,700,723 | 1/1929 | Imhoff | 210—17 |
| 1,939,924 | 12/1933 | Schimrigk | 210—541 X |
| 2,458,163 | 1/1949 | Hays | 210—9 X |
| 2,822,329 | 2/1958 | Griffith | 210—14 |
| 2,825,541 | 3/1958 | Moll et al. | 210—220 X |

FOREIGN PATENTS

| | | |
|---|---|---|
| 219,536 | 7/1924 | Great Britain. |

OTHER REFERENCES

Metcalf et al.: American Sewerage Practice vol. III, Disposal of Sewage, 1935, Third Edition, McGraw-Hill, New York, pp. 467–476.

MORRIS O. WOLK, *Primary Examiner.*